(12) United States Patent
Lee et al.

(10) Patent No.: US 7,638,610 B2
(45) Date of Patent: Dec. 29, 2009

(54) SELF-DISPERSIBLE METAL COMPLEX COLORANT COMPRISING AZO MOIETY

(75) Inventors: Kyung-hoon Lee, Suwon-si (KR); Seung-min Ryu, Yongin-si (KR); Yeon-kyoung Jung, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 491 days.

(21) Appl. No.: 10/912,562

(22) Filed: Aug. 6, 2004

(65) Prior Publication Data

US 2005/0054841 A1    Mar. 10, 2005

(30) Foreign Application Priority Data

Aug. 9, 2003    (KR) .................. 10-2003-0055214

(51) Int. Cl.
  C09B 43/12    (2006.01)
  C09B 43/22    (2006.01)
  C09D 11/00    (2006.01)
(52) U.S. Cl. .................. 534/654; 534/655; 534/656; 534/684; 534/692; 534/693; 534/714; 534/715; 534/716; 534/717; 534/718; 8/639; 8/674; 8/681; 8/685; 106/31.51; 106/31.52
(58) Field of Classification Search .................. 534/654, 534/655, 656, 684, 692, 693, 714, 715, 716, 534/717, 718; 8/639, 674, 681, 685; 106/31.51, 106/31.52
See application file for complete search history.

(56) References Cited

U.S. PATENT DOCUMENTS

| | | | |
|---|---|---|---|
| 2,842,536 A * | 7/1958 | Bauer et al. .................. 534/693 |
| 4,008,211 A | 2/1977 | Lienhard et al. |
| 4,218,367 A | 8/1980 | Brouard et al. |
| 5,001,227 A | 3/1991 | Schutz et al. |
| 5,095,100 A | 3/1992 | Ono et al. |
| 5,166,326 A | 11/1992 | Smith et al. |
| 5,180,705 A | 1/1993 | Smith et al. |
| 7,364,597 B2 * | 4/2008 | Jung et al. .................. 8/639 |

FOREIGN PATENT DOCUMENTS

| | | |
|---|---|---|
| EP | 0 947 563 A1 | 6/1999 |
| JP | 11-061015 | 3/1999 |
| JP | 11-343437 | 12/1999 |
| JP | 2002-275382 | 9/2002 |

OTHER PUBLICATIONS

Blus, Chemical Abstracts, 130:792609, 1998.*
U.S. Appl. No. 10/912,544, filed Aug. 6, 2004, Yeon-kyoung Jung et al., Samsung Electronics, Co., Ltd.

* cited by examiner

Primary Examiner—Fiona T Powers
(74) Attorney, Agent, or Firm—Staas & Halsey LLP

(57) ABSTRACT

A self-dispersible metal complex colorant is represented by formula 1, which has improved storage stability, may embody various colors and has improved fastness, such as light resistance, water resistance and the like:

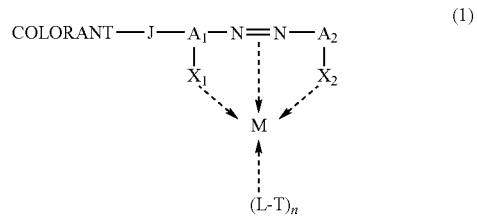

wherein each of $A_1$ and $A_2$ is independently a moiety which includes a substituted or unsubstituted $C_2$-$C_{30}$ alkenylene group having at least one double bond and is conjugated with an azo group; each of $X_1$ and $X_2$ is selected from the group consisting of a hydroxy group, a $C_1$-$C_4$ alkoxy group, a carboxyl group, and a substituted or unsubstituted amino group; M is a polyvalent transition metal; L is a neutral or anionic ligand; T is a mono- or poly-substituted hydrophilic functional group; n is an integer between 1 and 3; and J is a linker. The self-dispersible metal complex colorant may be used in various fields employing colors, such as fibers, foods, drugs, cosmetics, coatings, inks or ceramics.

26 Claims, No Drawings

SELF-DISPERSIBLE METAL COMPLEX COLORANT COMPRISING AZO MOIETY

CROSS-REFERENCE TO RELATED APPLICATIONS

This application claims the benefit of Korean Patent Application No. 2003-55214, filed on Aug. 9, 2003, in the Korean Intellectual Property Office, the disclosure of which is incorporated herein in its entirety by reference.

BACKGROUND OF THE INVENTION

1. Field of the Invention

The present invention relates to a self-dispersible metal complex colorant comprising an azo moiety, and more particularly, to a self-dispersible metal complex colorant which may be uniformly dispersed in a solution without a separate dispersing agent, have high stability during long-term storage, embody various colors and have effective fastness, such as light resistance, water resistance and the like.

2. Description of the Related Art

In general, colorants are substances which exhibit inherent colors by selectively absorbing and reflecting visible light. Colorants are used in various fields embodying colors, such as fibers, foods, drugs, cosmetics, coatings, ink for inkjet printers or printing, pigmenting plastics or rubbers, manufacturing furniture, textile printing, and making papers or ceramics.

Colorants are classified into dyes and pigments. Dyes are colorful substances that may be dissolved in water or oil and dispersed as single molecules, and may bind to molecules such as fibers for dyeing. Pigments are substances that do not dissolve in water or oil and form an opaque colorful film in the form of a powder on a surface of a material.

In general, dyes may have a wide range of colors that are bright and vivid. However, dyes are not light/water resistant, i.e., they may be bleached/discolored by light or may be diluted by water or organic solvents. On the other hand, pigments have more effective light/water resistance than dyes. However, pigments have a narrower range of colors than dyes. Thus, much research has been conducted to enhance light and water resistance, and the like of dyes, without reducing the variety of colors of dyes. One such dye includes a metal complex.

U.S. Pat. No. 5,095,100 discloses a method of producing a metal complex dye having an improved light resistance by forming coordinate bonds between the metal and an azo group and a specific functional group in the dye molecule. However, the method requires the presence of the azo group and the specific functional group in the dye molecule, thus limiting the types of the colorants to which the method may be applied. In addition, a metal complex dye obtained by forming coordinate bonds with the metal tends to have less solubility than dyes without coordinate bonds.

In general, dispersing agents are used to prevent formation of precipitates in a solution or aggregation of pigment particles. Dispersing agents prevent interactions between the pigment particles due to electrostatic or steric hindrance, thus allowing the insoluble pigment particles to be stable in the solution. However, conventional dispersing agents have a large molecular weight. Even a small change in an amount of dispersing agent used may cause a large change in rheology, such as viscosity, of an ink composition. Thus, it is very important to control the amount of the dispersing agent used in the production of the ink composition.

Thus, there is a need to enhance light resistance and water resistance while maintaining the inherent color of the dye by forming a metal complex in a colorant, such as a dye or a pigment, and to prevent the reduction of solubility of the dye and insolubility of the pigment due to the introduction of the metal complex by using a self-dispersible ligand.

SUMMARY OF THE INVENTION

The present invention provides a self-dispersible metal complex colorant which may be uniformly dispersed in a solution without a separate dispersing agent by forming a coordinate bond between a ligand having a hydrophilic group, the metal and an azo moiety in the colorant.

The present invention also provides a colorant composition comprising the self-dispersible metal complex colorant.

According to an aspect of the present invention, a self-dispersible metal complex colorant is represented by formula 1, in which an azo moiety is attached to a colorant, and coordinate bonds are formed between the azo moiety and a metal and between the metal and a self-dispersible ligand:

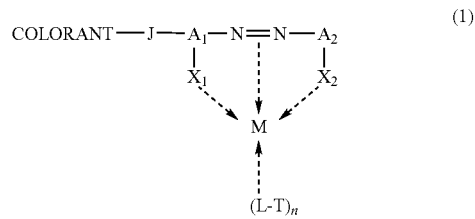

wherein each of $A_1$ and $A_2$ is independently a moiety which includes a substituted or unsubstituted $C_2$-$C_{30}$ alkenylene group having at least one double bond and is conjugated with an azo group;

each of $X_1$ and $X_2$ is selected from the group consisting of a hydroxy group, a $C_1$-$C_4$ alkoxy group, a carboxyl group, and a substituted or unsubstituted amino group;

M is a polyvalent transition metal;

L is a neutral or anionic ligand;

T is a mono- or poly-substituted hydrophilic functional group;

n is an integer between 1 and 3; and

J is a linker.

The self-dispersible metal complex colorant represented by formula 1 may be one of those represented by formulas 2 and 3:

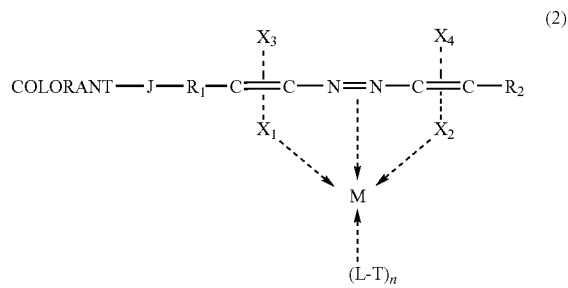

wherein J, $X_1$, $X_2$, M, L, T and n are defined as above;

$R_1$ is selected from the group consisting of a substituted or unsubstituted $C_1$-$C_{20}$ alkylene group, a substituted or unsubstituted $C_1$-$C_{20}$ heteroalkylene group, a substituted or unsubstituted $C_2$-$C_{20}$ alkenylene group, a substituted or unsubstituted $C_{2\text{-}20}$ heteroalkenylene group, a substituted or unsubstituted $C_6$-$C_{30}$ arylene group, and a substituted or unsubstituted $C_6$-$C_{30}$ heteroarylene group;

each of $X_3$, $X_4$ and $R_2$ is independently selected from the group consisting of a hydrogen, a halogen atom, a hydroxy group, a carboxyl group, a substituted or unsubstituted amino group, a sulfonic acid group, a phosphoric acid group, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_2$-$C_{20}$ heteroalkenyl group, a substituted or unsubstituted $C_6$-$C_{30}$ aryl group, and a substituted or unsubstituted $C_6$-$C_{30}$ heteroaryl group.

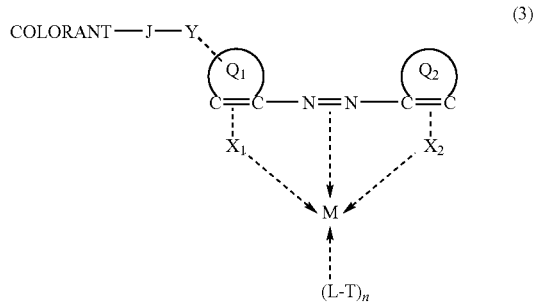

(3)

wherein $X_1$, $X_2$, M, J, L, T and n are defined as above;

each of $Q_1$ and $Q_2$ is independently selected from the group consisting of a substituted or unsubstituted $C_2$-$C_{20}$ cycloalkenylene group, a substituted or unsubstituted $C_6$-$C_{30}$ arylene group, a substituted or unsubstituted $C_2$-$C_{30}$ heterocycloalkenylene group, and a substituted or unsubstituted $C_4$-$C_{30}$ heteroarylene group, which has at least one double bond;

Y is selected from the group consisting of —O—, —S—, —P—, a carboxyl group, a substituted or unsubstituted amino group, a sulfonic acid group, a phosphoric acid group, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_2$-$C_{20}$ heteroalkenyl group, a substituted or unsubstituted $C_6$-$C_{30}$ aryl group, and a substituted or unsubstituted $C_6$-$C_{30}$ heteroaryl group.

According to another aspect of the present invention, a liquid composition comprises the self-dispersible metal complex colorant represented by formula 1 (see above), an aqueous liquid medium and/or an additive.

Additional aspects and/or advantages of the invention will be set forth in part in the description which follows and, in part, will be obvious from the description, or may be learned by practice of the invention.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

In general, a colorant includes a carboxylic acid group, a sulfonic acid group, a hydroxy group, an amino group, a phosphoric acid and the like. If an azo moiety containing in its surface a functional group capable of reacting with one of the above groups contained in the colorant is reacted with the colorant, the azo moiety may connect to the colorant via an ester bond or an amide bond or the like. A coordinate bond is formed between the azo moiety and a metal, and a coordinate bond is also formed between a ligand carrying a self-dispersible hydrophilic moiety and the metal, forming a self-dispersible metal complex colorant. Thus, by forming the metal complex, fastness of the colorant may be improved and dispersion of the colorant in a solution may be increased. It is also possible to embody various colors.

In addition, by forming coordinate bonds between a ligand carrying a self-dispersible hydrophilic moiety and a metal and between azo moiety with a metal, steric hindrance due to a bulky structure of the metal complex, electrostatic repulsion between the charged metal and a hydrophilic ligand, or the like, may result, thus allowing self-dispersion of the colorant, resulting in the long-term storage stability of the colorant.

A self-dispersible metal complex colorant according to an embodiment of the present invention is represented by formula 1.

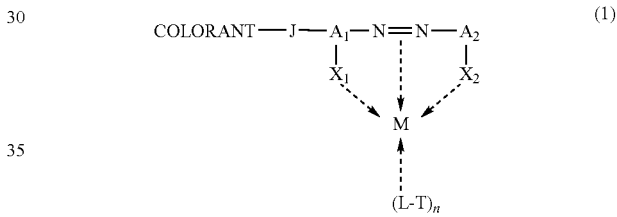

(1)

wherein each of $A_1$ and $A_2$ is independently a moiety which includes a substituted or unsubstituted $C_2$-$C_{30}$ alkenylene group having at least one double bond and is conjugated with an azo group;

each of $X_1$ and $X_2$ is selected from the group consisting of a hydroxy group, a $C_1$-$C_4$ alkoxy group, a carboxyl group, and a substituted or unsubstituted amino group;

M is a polyvalent transition metal;

L is a neutral or anionic ligand;

T is a mono- or poly-substituted hydrophilic functional group;

n is an integer between 1 and 3; and

J is a linker.

In the metal complex colorant represented by formula 1, each of $A_1$ and $A_2$ is a moiety which includes a $C_2$-$C_{30}$ alkenylene group, preferably a $C_2$-$C_{15}$ alkenylene group, and may be in the form of a cyclic or an acyclic system. In the case of a cyclic system, the moiety may be aromatic or non-aromatic.

$A_1$ and $A_2$ are respectively connected to the substituents $X_1$ and $X_2$, which may be bonded to a metal. Each of $X_1$ and $X_2$ may be independently a hydroxy group, a $C_1$-$C_4$ alkoxy group, a carboxyl group, or an amino group or the like, In the metal complex colorant represented by formula 1, M is a polyvalent transition metal having an oxidation number of +1 to +5. Examples of the polyvalent transition metal include aluminum, gold, cerium, cobalt, chromium, copper, europium, iron, potassium, germanium, indium, lanthanum, manganese, nickel, palladium, platinum, rhodium, ruthenium, scandium, silicon, samarium, titanium, uranium, zinc, zirconium, and the like, and preferably nickel, copper, zinc, iron, chromium, palladium, platinum, and cobalt.

In the metal complex colorant represented by formula 1, the neutral ligand may be a monodentate ligand, a bidentate ligand, a trimonodentate ligand or the like. Specific examples of the neutral ligand include ammonia, water, triphenylphosphine, *$NH_2R''NH_2$* (wherein R'' is a substituted or unsubstituted $C_1$-$C_{20}$ alkylene group, a substituted or unsubstituted $C_1$-$C_{20}$ heteroalkylene group, a substituted or unsubstituted $C_6$-$C_{30}$ arylene group, or a substituted or unsubstituted $C_4$-$C_{30}$ heteroarylene group), 2,2'-bipyridine, 1,10-phenanthroline, and 2,2',2''-terpyridine.

In the metal complex colorant represented by formula 1, the anionic ligand has a charge of −1 to −6 and may be at least one selected from the group consisting of a halogen atom ion ($F^-$, $Cl^-$, $Br^-$, $I^-$), R''—$NO_{3*}$ (wherein R'' is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl, and a substituted or unsubstituted $C_4$-$C_{30}$ heteroaryl group), a substituted or unsubstituted $C_1$-$C_{20}$ alkylcarboxylate ion (such as acetate and trifluoroacetate), R''CN* (wherein R'' is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, a substituted or unsubstituted $C_4$-$C_{20}$ heteroaryl group, and —$(CH_2CH_2O)_Z$— (wherein Z is a number between 1 and 50), R''OO* (wherein R'' is selected from a group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, and a substituted or unsubstituted $C_4$-$C_{20}$ heteroaryl group), R''O* (wherein R'' is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, and a substituted or unsubstituted $C_4$-$C_{20}$ heteroaryl group), R''SCN* (wherein R'' is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, and a substituted or unsubstituted $C_4$-$C_{20}$ heteroaryl group), R''$N_3$* (wherein R'' is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, and a substituted or unsubstituted $C_4$-$C_{20}$ heteroaryl group), R''$CO_3$* (wherein R'' is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, and a substituted or unsubstituted $C_4$-$C_{20}$ heteroaryl group), and R''$SO_4$* (wherein R'' is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, and a substituted or unsubstituted $C_4$-$C_{20}$ heteroaryl group).

In the metal complex colorant represented by formula 1, T is a hydrophilic moiety and is selected from the group consisting of —OA, —R'OA, —R'COOA, —COOA, —CO—, —$SO_3$A—, —$SO_2$A—, —$SO_2NH_2$, —R'$SO_2$A, —$PO_3$H, —$PO_3$A, —$SO_2$NHCOR, —$NH_2$, and —$NR_3$ (wherein R is selected from the group consisting of a substituted or unsubstituted $C_1$-$C_{20}$ alkyl group, a substituted or unsubstituted $C_6$-$C_{30}$ aryl group, or a substituted or unsubstituted $C_4$-$C_{30}$ heteroaryl group, R' is a substituted or unsubstituted $C_1$-$C_{20}$ alkylene group, a substituted or unsubstituted $C_6$-$C_{30}$ arylene group, and a substituted or unsubstituted $C_4$-$C_{30}$ heteroarylene group).

A is at least one selected from the group consisting of a hydrogen atom, an alkali metal, ammonium, a substituted or unsubstituted $C_1$-$C_{12}$ alkyl group, and a substituted or unsubstituted $C_6$-$C_{30}$ aryl group.

In the metal complex colorant represented by formula 1, J is a linker connecting the azo group to the colorant. The linker may be formed when chemically bonding the azo group to the colorant or by chemically bonding the linker to the colorant and then bonding the azo group to the linker. Examples of the linker include —O—, —NR—, —N=N—, —S, —P—, —C(=O)—NR—, —NR—C(=O)—, —S(=O)(=O)O—, —C(=O)O—, —O—C(=O)—, —P(=O)O—, —C(=O)—O—C(=O)—, —C(=O)—S—C(=O)—, —C(=O)—NR—C(=O)—, —C(=N)—O—C(=N)—, —C(=S)—O—C(=S)—, —C(=N)—NR—C(=N)—, —C(=S)—NR—C(=S)—, —C(=N)—S—C(=N)—, —C(=S)—S—C(=S)— (wherein R is a hydrogen or a substituted or unsubstituted $C_1$-$C_4$ alkyl group), and a chemical bond, for example, a single bond, a double bond, or the like.

When each of $A_1$ and $A_2$ in the metal complex colorant represented by formula 1 is an acyclic system, the metal complex colorant may be represented by formula 2.

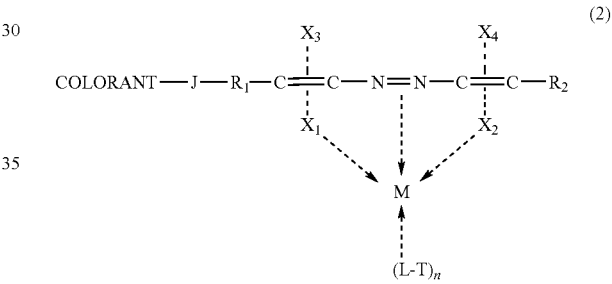

(2)

wherein

J, $X_1$, $X_2$, M, L, T and n are defined as above, $R_1$ is selected from the group consisting of a substituted or unsubstituted $C_1$-$C_{20}$ alkylene group, a substituted or unsubstituted $C_1$-$C_{20}$ heteroalkylene group, a substituted or unsubstituted $C_2$-$C_{20}$ alkenylene group, a substituted or unsubstituted $C_2$-$C_{20}$ heteroalkenylene group, a substituted or unsubstituted $C_6$-$C_{30}$ arylene group, and a substituted or unsubstituted $C_6$-$C_{30}$ heteroarylene group, each of $X_3$, $X_4$ and $R_2$ is independently selected from the group consisting of a hydrogen atom, a halogen atom, a hydroxy group, a carboxyl group, a substituted or unsubstituted amino group, a sulfonic acid group, a phosphoric acid group, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_2$-$C_{20}$ heteroalkenyl group, a substituted or unsubstituted $C_6$-$C_{30}$ aryl group, and a substituted or unsubstituted $C_6$-$C_{30}$ heteroaryl group.

In the metal complex colorant represented by formula 2, $A_1$ and $A_2$, which are adjacent to the azo group, are each acyclic conjugated systems. In formula 2, each of $X_1$ and $X_2$ is adjacent to the azo group and connected to one of the double-bonded carbon atoms, and forms a coordinate bond with a center metal M. Each of the other carbon atoms of the double-bonded carbon atoms, to which $X_1$ and $X_2$ are not connected, may be substituted with a hydrogen atom, a halogen atom, a hydroxy group, a carboxyl group, an amino group, or a substituted or unsubstituted $C_1$-$C_8$ lower alkyl group.

The metal complex colorant having formula 1 in which an alkylene group-containing moiety adjacent to the azo group has a cyclic system is represented by formula 3:

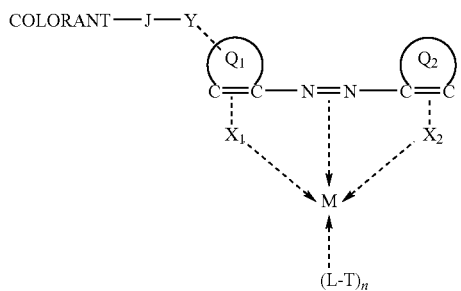

(3)

wherein $X_1$, $X_2$, M, J, L, T and n are defined as above, each of $Q_1$ and $Q_2$ has at least one double bond, and is independently selected from the group consisting of a substituted or unsubstituted $C_2$-$C_{20}$ cycloalkenylene group, a substituted or unsubstituted $C_6$-$C_{30}$ arylene group, a substituted or unsubstituted $C_2$-$C_{30}$ heterocycloalkenylene group, and a substituted or unsubstituted $C_4$-$C_{30}$ heteroarylene group; and Y is selected from the group consisting of —O—, —S—, —P—, a carboxyl group, a substituted or unsubstituted amino group, a sulfonic acid group, a phosphoric acid group, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_2$-$C_{20}$ heteroalkenyl group, a substituted or unsubstituted $C_6$-$C_{30}$ aryl group, and a substituted or unsubstituted $C_6$-$C_{30}$ heteroaryl group.

In the metal complex colorant represented by formula 3, $A_1$ and $A_2$ have cyclic systems. Each of the cyclic systems includes an alkenylene group adjacent to the azo group. Each of the cyclic systems may be an aromatic or a non-aromatic system. Each of the cyclic systems may be a 4 to 8 member cyclic system and may be substituted with a suitable substituent. The cyclic system may be a polycyclic system, such as bicycle or tricycle. Each ring in the polycyclic system may be fused to form a fused ring. The cyclic system is mono- or poly-substituted. When poly-substitued, the substituents consist of identical or different substituents, for example, a hydrogen atom, a halogen atom, a hydroxy group, a carboxyl group, a substituted or unsubstituted amino group, a sulfonic acid group, a phosphoric acid group, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_2$-$C_{20}$ heteroalkenyl group, a substituted or unsubstituted $C_6$-$C_{30}$ aryl group, or a substituted or unsubstituted $C_6$-C30 heteroaryl group.

The metal complex colorants having formulas 1 through 3 according to embodiments of the present invention are obtained by forming a general chemical bond, for example, an ester bond or an amide bond, between a functional group generally included in a colorant such as a carboxylic acid group, a sulfonic acid group, a hydroxy group, an amino group, a phosphoric acid group or the like, and a functional group included in its surface of an azo moiety to introduce an azo moiety into the colorant and then forming coordinate bonds between the azo moiety and a metal and between the neutral or anionic ligand and the metal.

Colorants that may be bonded with an azo moiety in embodiments of the present invention include, but are not limited to, a conventional dye or pigment containing an amino group, a carboxyl group, a hydroxyl group, a phosphoric acid group or a sulfonic acid group in the molecule and a colorant into which one of the above groups may be introduced via a conventional reaction.

Specific examples of the dye include C.I. DIRECT BLACK 9, 17, 19, 22, 32, 56, 91, 94, 97, 166, 168, 174, 199, C.I. DIRECT BLUE 1, 10, 15, 22, 77, 78, 80, 200, 201, 202, 203, 207, 211, C.I. DIRECT RED 2, 4, 9, 23, 31, 39, 63, 72, 83, 84, 89, 111, 173, 184, 240, C.I. DIRECT YELLOW 8, 9, 11, 12, 27, 28, 29, 33, 35, 39, 41, 44, 50, 53, 58 and the like. Specific examples of the pigment include carbon black, graphite, vitreous carbon, activated charcoal, activated carbon, anthraquinone, phthalocyanin blue, phthalocyanin green, diazos, monoazos, pyranthrones, perylene, quinacridone, indigoid pigments and the like.

The self-dispersible metal complex colorant represented by formula 1 may be used in various applications such as fibers, lather, fur, foods, drugs, cosmetics, coatings, ink for ink-jet printers or printing, pigmenting plastics or rubbers, manufacturing furniture, textile printing, making papers or ceramics, and the like. A composition according to anther embodiment of the present invention comprises the metal complex colorant represented by formula 1, an aqueous liquid medium and/or an additive.

Hereinafter, an ink composition according to an exemplary embodiment of the present invention will be specifically described. This exemplary embodiment is not meant to limit the scope of the present invention.

An ink composition according to an exemplary embodiment of the present invention includes 1 to 20 parts by weight, preferably 1 to 10 parts by weight of the self-dispersible metal complex colorant presented by formula 1 based on 100 parts by weight of the ink composition.

According to another exemplary embodiment of the present invention, an ink composition comprises a conventional colorant and the self-dispersible metal complex colorant represented by formula 1 as a colorant component. That is, the ink composition comprises a mixture of a conventional colorant and the self-dispersible metal complex colorant represented by formula 1, and an aqueous liquid medium and/or an additive.

The ink composition of the present embodiment includes 1 to 15 parts by weight of the conventional colorant and 1 to 15 parts by weight of the self-dispersible metal complex colorant based on 100 parts by weight of the ink composition, and the total concentration of the conventional colorant and the self-dispersible metal complex colorant may be in a range of 2 to 20 parts by weight based on 100 parts by weight of the ink composition. The total concentration of the conventional colorant and the self-dispersible metal complex colorant may preferably be in a range of 2 to 10 parts by weight based on 100 parts by weight of the ink composition In the ink compositions according to the exemplary embodiments of the present invention, the conventional colorant and the self-dispersible metal complex colorant may be dissolved or dispersed in an aqueous liquid medium.

The aqueous liquid medium may be water or a mixture of 5 to 50 parts by weight of an organic solvent and 50 to 95 parts by weight of water. The amounts of water and the organic solvent depend on various factors, for example, characteristics of the ink composition such as viscosity, surface tension, drying speed, and the like. Also, the characteristics of the ink depend on methods of printing the ink and the type of substrates on which the ink is printed.

The organic solvent used in the aqueous liquid medium may be selected from the group consisting of alcohol compounds, such as methyl alcohol, ethyl alcohol, n-propyl alcohol, isopropyl alcohol, n-butyl alcohol, sec-butyl alcohol, t-butyl alcohol or isobutyl alcohol; aliphatic ketone compounds, such as acetone, methyl ethyl ketone, diethyl ketone or diacetone alcohol; ester compounds, such as methyl acetate, ethyl acetate or ethyl lactate; polyvalent alcohol compounds, such as ethylene glycol, diethylene glycol, triethylene glycol, propylene glycol, butylene glycol, 1,4-butane diol, 1,2,4-butane triol, 1,5-pentane diol, 1,2,6-hexane triol, hexylene glycol, glycerol, glycerol ethoxylate or trimethylolpropane ethoxylate; ether compounds, such as ethylene glycol monomethyl ether, ethylene glycol monoethyl ether, diethylene glycol methyl ether, diethylene glycol ethyl ether, triethylene glycol monomethyl ether or triethylene glycol monoethyl ether; nitrogen-containing compounds, such as 2-pyrolidone or N-methyl-2-pyrolidone; and sulfur-containing compounds, such as dimethyl sulfoxide, tetramethylsulfone or thioglycol.

The ink composition according to the exemplary embodiments of the present invention may further comprise at least one additive selected from the group consisting of a viscosity control agent, a surfactant, a storage stabilizer, and a wetting agent.

The viscosity control agent controls the viscosity of the ink composition to facilitate good spraying characteristics. Examples of the viscosity control agent include casein, hydroxymethylcellulose, hydroxyethylcellulose, and carboxymethylcellulose. The concentration of the viscosity control agent may be in a range of 0.1 to 5.0 parts by weight based on 100 parts by weight of the ink composition.

The ink composition according to the exemplary embodiments of the present invention may include 0.1 to 5 parts by weight of the surfactant based on 100 parts by weight of the ink composition.

The surfactant controls surface tension of the ink composition to stabilize a jetting performance at nozzles. An anionic surfactant, a cationic surfactant or a non-ionic surfactant may be used as the surfactant.

Examples of the anionic surfactant include $C_1$-$C_{1000}$ alkylcarboxylates (preferably, $C_{10}$-$C_{200}$ alkylcarboxylates), $C_1$-$C_{1000}$ alcohol sulfonic acid ester salts (preferably, $C_{10}$-$C_{200}$ alcohol sulfonic acid ester salts), $C_1$-$C_{1000}$ alkylsufonates (preferably, $C_{10}$-$C_{200}$ alkylsufonates), $C_1$-$C_{1000}$ alkyl benzenesulfonates (preferably, $C_{10}$-$C_{200}$ alkylbenzenesulfonates), and mixtures thereof.

Examples of the cationic surfactant include salts of fatty acid amine, quaternary ammonium salts, sulfonium salts, phosphonium salts, and mixtures thereof.

Examples of the non-ionic surfactant include polyoxyethylene alkyl ether (wherein alkyl is a $C_1$-$C_{1000}$ alkyl group, preferably a $C_{10}$-$C_{200}$ alkyl group), polyoxyethylene alkyl phenyl ether (wherein alkyl is a $C_1$-$C_{1000}$ alkyl group, preferably a $C_{10}$-$C_{200}$ alkyl group), polyoxyethylene secondary alcohol ether, polyoxyethylene-oxypropylene block copolymer, polyglycerin fatty acid ester, sorbitan fatty acid ester, and mixtures thereof.

The ink composition according to the exemplary embodiments of the present invention may include 0.1 to 5 parts by weight of the storage stabilizer based on 100 parts by weight of the ink composition.

The wetting agent prevents clogging of the ink composition at the nozzles. The wetting agent may be a polyhydric alcohol. Examples of the wetting agent include glycerin, ethylene glycol, diethylene glycol, triethylene glycol, propylene glycol, dipropylene glycol, hexylene glycol, 1,3-butane diol, 1,4-butane diol, 1,5-pentane diol, 2-buten-1,4-diol, 2-methyl-2-pentane diol and mixtures thereof.

The ink composition according to the exemplary embodiments of the present invention may include 5 to 30 parts by weight of the wetting agent based on 100 parts by weight of the ink composition.

The ink composition according to the exemplary embodiments of the present invention may further comprise 0.5 to 40 parts by weight of the total content of additives selected from the group consisting of a viscosity control agent, a surfactant, a storage stabilizer, a wetting agent, a pH adjusting agent and a penetrant based on 100 parts by weight of the ink composition.

A method of preparing the ink composition according to the exemplary embodiments of the present invention will now be described.

The self-dispersible metal complex colorant and/or a conventional colorant together with additives, such as a viscosity control agent and a surfactant, are mixed into an aqueous liquid medium, and then stirred to obtain a uniform ink composition. Then, the composition is passed through a 0.45 to 0.8 μm filter to obtain the ink composition according to the exemplary embodiments of the present invention.

The present invention will be described in more detail by presenting the following examples. These examples are for illustrative purposes only, and are not intended to limit the scope of the present invention. The following tests were used to evaluate the characteristics of ink. The tests may also be applied to wet-type toners, dry-type toners, coatings and/or coating solutions. An ink composition will be described as a representative embodiment of the composition comprising the self-dispersible metal complex colorant represented by formula 1. However, this is not meant to limit the scope of the present invention.

EXAMPLES

Synthesis Example 1

(1) 36.5 g of ACID RED 4 (E—$SO_3Na$), 300 ml of DMSO (dimethylsulfoxide) and 31.5 g of an azo compound having formula 5 below were placed in a 500 ml Erlenmeyer flask and melted. One or two boiling chips were introduced into the flask and 30 ml of concentrated sulfuric acid was slowly added. Then, the flask was connected to a reflux cooler, and the mixture was refluxed at 80° C. for at least 8 hours. Next, the mixture was cooled to room temperature and an excess of methanol was added to form crystals, and then the crystals were filtered through a suction filter. To remove unreacted reactants, the filtered crystals were dissolved again in DMSO, and methanol was added to form crystals; the crystals were filtered through a suction filter. The filtered crystals were dried in an oven to obtain a colorant having formula 6 below (42.6 g).

(2) 34.2 g of the colorant having formula 6 below obtained in (1) and 13 g of an aqueous ammonia solution (30%) were added to 400 ml of ethylene glycol, and then 13 g of $Co(CH_3COO)_2 \cdot 4H_2O$ was added and then the mixture was mixed at 100° C. Then, 400 ml of hot water and 40 g of 4-aminobenzoic acid were added to the solution and precipitated, filtered and washed. Subsequently, the product was dried in an oven to obtain a metal complex colorant (25 g).

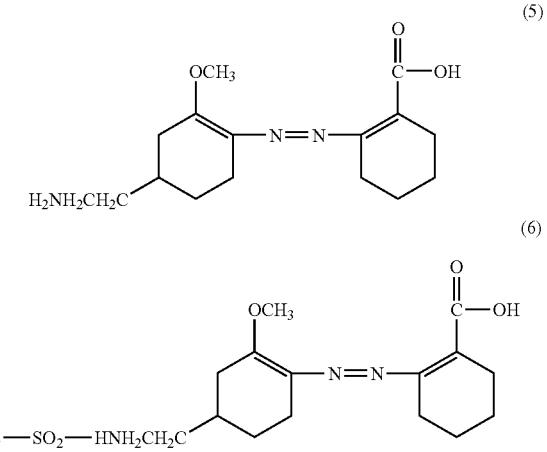

(5)

(6)

Synthesis Example 2

41.3 g of DIRECT BLACK 51 (E—COOH), 300 ml of DMSO and 25.0 g of an azo compound having formula 7 below were placed in a 500 ml Erlenmeyer flask and melted. One or two boiling chips were introduced into the flask and 30 ml of concentrated sulfuric acid was slowly added. Then, the flask was connected to a reflux cooler and the mixture was refluxed at 80° C. for at least 8 hours. Next, the mixture was cooled to room temperature and an excess of methanol was added to form crystals; then, the crystals were filtered through a suction filter. To remove unreacted reactants, the filtered crystals were dissolved again in DMSO and methanol was added to form crystals; then, the crystals were filtered through a suction filter. The filtered crystals were dried in an oven to obtain a colorant having formula 8 below (42.2 g).

33.3 g of the colorant having formula below 8 obtained in (1) was dissolved in 150 ml of water and 10.7 g of $CrCl_3 \cdot 6H_2O$ was added. 36 g of 6-aminohexanoic acid was added to the resultant solution and refluxed at pH 3 for at least 6 hours. The solution was adjusted to pH 6 to form precipitates. Then, the precipitates were filtered and washed to obtain a metal complex colorant (25.5 g).

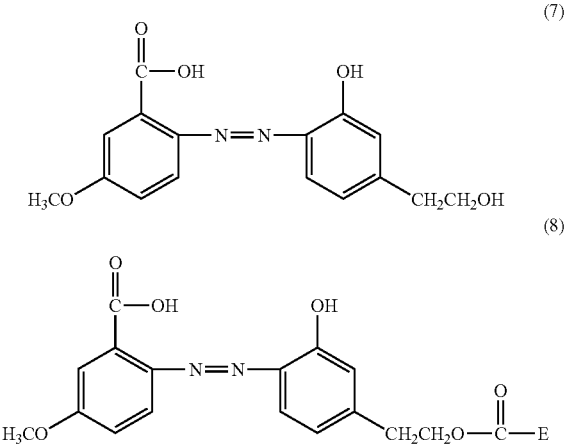

(7)

(8)

Synthesis Example 3

(1) 100 ml of DMSO and 23.2 g of an azo compound having formula 9 below were placed in a 500 ml Erlenmeyer flask and melted. 14.8 g of $SOCl_2$ was introduced into the flask and the mixture reacted for one hour at room temperature to obtain a first solution. A solution of DIRECT BLACK 168 (E—OH) (73.1 g) in 200 ml of DMSO was added to the first solution in the flask and one or two boiling chips were introduced into the flask. Then, the flask was connected to a reflux cooler and the mixture was refluxed at 80° C. for at least 6 hours. Next, the mixture was cooled to room temperature and an excess of methanol was added to form crystals and then the crystals were filtered through a suction filter. To remove unreacted reactants, the filtered crystals were dissolved again in DMSO and methanol was added to form crystals and then the crystals were filtered through a suction filter. The filtered crystals were dried in an oven to obtain a colorant having formula 10 below (54.3 g).

(2) 20 g of ammonia and then 6.8 g of $CuCl_2 \cdot 2H_2O$ were added to 500 ml of water and melted. 32.4 g of the colorant having formula 10 below obtained in (1) was added to the resultant solution and mixed while heating to 80° C. and then 30 g of 3-hydroxybutyric acid and 150 ml of hot water were added to the mixture. Then, NaCl was added to the mixture to form precipitates. Then, the precipitates were filtered and dried in an oven to obtain a metal complex colorant (27.5 g).

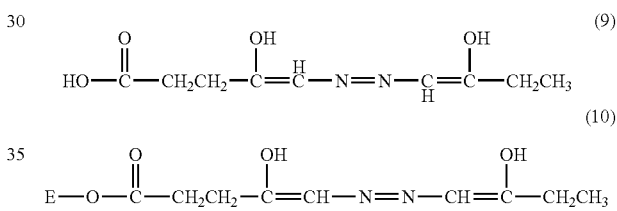

Synthesis Example 4

(1) A colorant having formula 11 below (45.0 g) was produced in the same manner as in Synthesis example 3 (1), except that 47.8 g of PIGMENT RED 177 (E—$NH_2$) was used instead of 73.1 g of DIRECT BLACK 168 (E—OH).

(2) 20 g of ammonia and then 8.5 g of $CuCl_2 \cdot 2H_2O$ were added to 500 ml of toluene and melted. 31.5 g of the colorant having formula 11 below obtained in (1) was added to the resultant solution and mixed while heating to 80° C., and then 30 g of 3-hydroxybutyric acid and 150 ml of hot water were added to the mixture. Then, NaCl was added to the mixture to form precipitates. Then, the precipitates were filtered and dried in an oven to obtain a metal complex colorant (23.7 g).

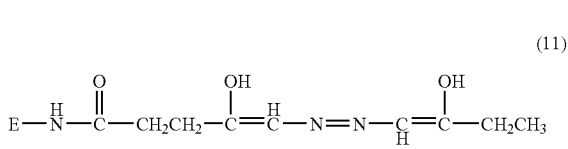

Synthesis Example 5

(1) A colorant having formula 13 below (45.2 g) was produced in the same manner as in Synthesis example 3 (1), except that 41.4 g of a colorant having formula 12 below was used instead of 23.2 g of an azo compound having formula 9 and 34.4 g of PIGMENT RED 57 (E—COOH) was used instead of 73.1 g of DIRECT BLACK 168 (E—OH).

(2) 34.2 g of the colorant having formula 13 below obtained in (1) was dissolved in 150 ml of water and 9.2 g of $CrCl_3.6H_2O$ was added to the solution. 36 g of 6-aminohexanoic acid was added to the resultant solution and refluxed at pH 3 for at least 6 hours. Then, the reaction solution was adjusted to pH 6 to form precipitates. The precipitates were filtered and washed to obtain a metal complex colorant (26.0 g).

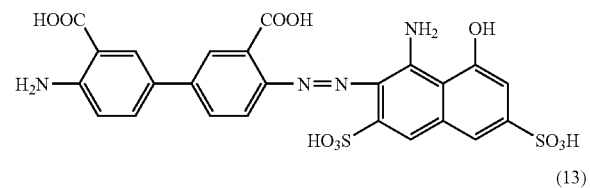

(12)

(13)

Synthesis Example 6

(1) 26.7 g of an azo compound having formula 14 was dissolved in 200 ml of DMSO in a 500 ml Erlenmeyer flask and 41.3 g of PIGMENT RED 177 (E—$NH_2$) was added to the resultant solution. Then, the mixture was treated at 120° C. for at least 12 hours and the solution was concentrated. The concentrated solution was dissolved in ether and washed with distilled water several times and extracted to obtain an ether layer. Then, the ether layer was concentrated to obtain a colorant having formula 15 below (43.2 g).

(2) 29.6 g of a metal complex colorant was produced in the same manner as in Synthesis example 1 (2), except that 36.9 g of the colorant having formula 15 was used instead of 34.2 g of the colorant having formula 6 and 13.2 g of $Co(CH_3COO)_2.4H_2O$ were used instead of 13 g of $Co(CH_3COO)_2.4H_2O$.

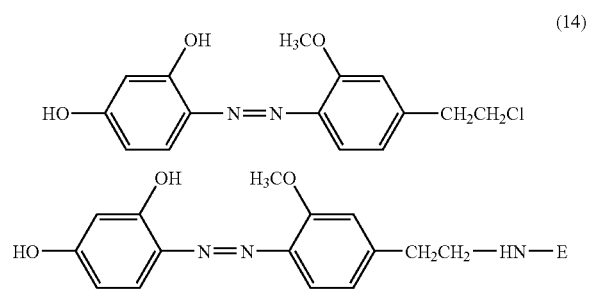

(14)

Example 1

| Ink composition | |
| --- | --- |
| Metal complex colorant in Synthesis example 1 (2) | 4 g |
| Water | 81 g |
| Isopropyl alcohol | 3 g |
| Ethylene glycol | 4 g |
| Diethylene glycol | 8 g |

The above components were mixed and stirred well in a stirrer for at least 30 minutes until a uniform mixture was obtained. Then, the resultant product was filtered through a 0.45 μm filter to prepare an ink composition containing a metal complex colorant according to an embodiment of the present invention.

Example 2

An ink composition was prepared in the same manner as in Example 1, except that the metal complex colorant in Synthesis example 2 (2) was used instead of the metal complex colorant in Synthesis example 1 (2).

Example 3

| Ink composition | |
| --- | --- |
| Metal complex colorant in Synthesis example 3 (2) | 4 g |
| Water | 77 g |
| Isopropyl alcohol | 3 g |
| Ethylene glycol | 10 g |
| Glycerine | 6 g |

The above components were mixed and stirred well in a stirrer for at least 30 minutes until a uniform mixture was obtained. Then, the resultant product was filtered through a 0.45 μm filter to prepare an ink composition containing a metal complex colorant according to an embodiment of the present invention.

Example 4

| Ink composition | |
| --- | --- |
| Metal complex colorant in Synthesis example 4 (2) | 4 g |
| Water | 77 g |
| Isopropyl alcohol | 3 g |
| Diethylene glycol | 10 g |
| Glycerine | 6 g |

The above components were mixed and stirred well in a stirrer for at least 30 minutes until a uniform mixture was obtained. Then, the resultant product was filtered through a 0.8 μm filter to prepare an ink composition containing a metal complex colorant according to an embodiment of the present invention.

Example 5

| Ink composition | |
| --- | --- |
| Metal complex colorant in Synthesis example 3 (2) | 4 g |
| Water | 77 g |
| Ethylene glycol | 10 g |
| Diethylene glycol | 3 g |
| Glycerine | 6 g |

The above components were mixed and stirred well in a stirrer for at least 30 minutes until a uniform mixture was obtained. Then, the resultant product was filtered through a 0.8 μm filter to prepare an ink composition containing a metal complex colorant according to an embodiment of the present invention.

Example 6

| Ink composition | |
| --- | --- |
| Metal complex colorant in Synthesis example 3 (2) | 4 g |
| Water | 80 g |
| Isopropyl alcohol | 4 g |
| Ethylene glycol | 8 g |
| Diethylene glycol | 4 g |

The above components were mixed and stirred well in a stirrer for at least 30 minutes until a uniform mixture was obtained. Then, the resultant product was filtered through a 0.8 μm filter to prepare an ink composition containing a metal complex colorant according to an embodiment of the present invention.

Comparative Example 1

An ink composition was prepared in the same manner as in Example 1, except that ACID RED 4 was used instead of the metal complex colorant in Synthesis example 1 (2).

Comparative Example 2

An ink composition was prepared in the same manner as in Example 2, except that DIRECT BLACK 51 was used instead of the metal complex colorant in Synthesis example 2 (2).

Comparative Example 3

An ink composition was prepared in the same manner as in Example 3, except that DIRECT BLACK 168 was used instead of the metal complex colorant in Synthesis example 3 (2).

Comparative Example 4

An ink composition was prepared in the same manner as in Example 4, except that PIGMENT RED 177 was used instead of the metal complex colorant in Synthesis example 4 (2) and TEGO DISPERS 750W (available form TEGO) was further included as a dispersing agent.

Comparative Example 5

An ink composition was prepared in the same manner as in Example 5, except that PIGMENT RED 57 was used instead of the metal complex colorant in Synthesis example 5 (2) and TEGO DISPERS 750W (available form TEGO) was further included as a dispersing agent.

Comparative Example 6

An ink composition was prepared in the same manner as in Example 6, except that PIGMENT RED 177 was used instead of the metal complex colorant in Synthesis example 6 (2) and TEGO DISPERS 750W (available form TEGO) was further included as a dispersing agent.

The characteristics of the ink compositions prepared in the above Examples and Comparative examples were measured according to the following methods.

Experimental Example 1

Test of Long-Term Storage Stability 100 ml of the ink compositions obtained in Examples 1 through 6 and Comparative examples 1 through 6 were respectively placed in heat resistant glass bottles, sealed and then stored at 60° C. in a constant temperature bath. The bottles were left for 2 months, and then it was confirmed whether precipitates formed at the bottoms of the bottles. The results are shown in Table 1.

0: no precipitate Δ: partially precipitated X: precipitated

TABLE 1

| | Example | | | | | | Comparative example | | | | | |
| --- | --- | --- | --- | --- | --- | --- | --- | --- | --- | --- | --- | --- |
| | 1 | 2 | 3 | 4 | 5 | 6 | 1 | 2 | 3 | 4 | 5 | 6 |
| Storage stability | 0 | 0 | 0 | 0 | 0 | 0 | 0 | 0 | 0 | Δ | Δ | Δ |

Referring to Table 1, the ink compositions obtained using the self-dispersible metal complex colorant according to embodiments of the present invention (Examples 1 to 6) and the ink compositions obtained using the conventional dye-type colorants (Comparative examples 1 to 3) did not form precipitates, like the conventional dyes having excellent solubility and storage stability. Meanwhile, the ink compositions using the self-dispersible metal complex colorant in Examples 1 to 6 had more effective storage stability than the ink compositions using the conventional pigment-type colorants in Comparative examples 4 to 6.

Experimental Example 2

Test of Light Resistance

The ink compositions obtained in Examples 1 to 6 and Comparative examples 1 to 6 were respectively charged into a SAMSUNG ELECTRONICS CO., LTD. ink cartridge, and 2 cm×2 cm of solid patterns were printed using each ink in cartridge. The printed patterns were exposed to light in a Q-SUN Xenon Test Chamber for 100 hours. Subsequently, the changes in OD values before and after exposure were determined and estimated as follows. The results are shown in Table 2.

$A = OD(\text{after exposure})/OD(\text{before exposure}) \times 100(\%)$

O: $A \geq 90\%$ $\Delta$: $75 \leq A < 90\%$

X: $A < 75\%$

TABLE 2

|  | Example | | | | | | Comparative example | | | | | |
| --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 |
| Light resistance | O | O | O | O | O | O | X | X | X | $\Delta$ | $\Delta$ | $\Delta$ |

Referring to Table 2, the ink compositions obtained using the self-dispersible metal complex colorant according to embodiments of the present invention in Examples 1 to 6 had more effective light resistance than the compositions obtained using the conventional colorants in Comparative examples 1 to 6. This demonstrates that the light resistance of colorants was reinforced due to the formation of metal complex.

Experimental Example 3

Test of Water Resistance

Solid patterns were printed in the same manner as in Experimental example 2 using the ink compositions obtained in Examples 1 to 6 and Comparative examples 1 to 6, respectively. After drying for one hour, each of the images was dipped into distilled water in a container for 5 minutes and removed from the container for drying. The changes of OD values before and after dipping into the distilled water were determined. The results are shown in Table 3.

0: the change is less than 20% with respective to the initial OD

X: the change is at least 20% with respect to the initial OD

TABLE 3

|  | Example | | | | | | Comparative example | | | | | |
| --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 |
| Water resistance | 0 | 0 | 0 | 0 | 0 | 0 | X | X | X | 0 | 0 | 0 |

Referring to Table 3, the ink compositions obtained using the self-dispersible metal complex colorant according to embodiments of the present invention in Examples 1 to 6 had more effective water resistance than that of the compositions obtained using the conventional colorants in Comparative examples 1 to 6. Thus, this demonstrates that water resistance of colorants was reinforced due to the formation of metal complex.

The self-dispersible metal complex colorant, according to an embodiment of the present invention represented by formula 1, may include a colorant which does not include a moiety capable of forming a coordinate bond with a metal, while colorants included in conventional metal complex colorants must include such a moiety. In addition, the self-dispersible metal complex colorant may embody various colors and have improved fastness, such as light resistance and water resistance.

In addition, by forming coordinate bonds between a ligand carrying a self-dispersible hydrophilic moiety and a metal and between an azo moiety with a metal, steric hindrance due to a bulky structure of the metal complex, electrostatic repulsion between the charged metal and a hydrophilic ligand, and the like may result, thus allowing self-dispersion of the colorant, resulting in the long-term storage stability of the colorant.

The self-dispersible metal complex colorant, according to embodiments of the present invention, may be used in various fields employing colors, such as fibers, foods, drugs, cosmetics, coatings, inks or ceramics.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A self-dispersible metal complex colorant represented by formula 2:

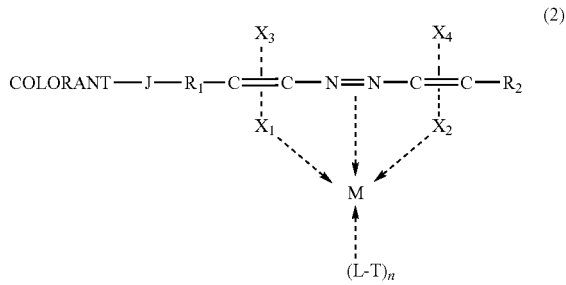

wherein:

$R_1$ is selected from the group consisting of a substituted or unsubstituted $C_1$-$C_{20}$ alkylene group, a substituted or unsubstituted $C_1$-$C_{20}$ heteroalkylene group, a substituted or unsubstituted $C_2$-$C_{20}$ alkenylene group, and a substituted or unsubstituted $C_2$-$C_{20}$ heteroalkenylene group; and $R_2$ is selected from the group consisting of a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, and a substituted or unsubstituted $C_2$-$C_{20}$ heteroalkenyl group;

each of $X_3$ and $X_4$ is independently selected from the group consisting of a hydrogen atom, a halogen atom, a hydroxy group, a carboxyl group, a substituted or unsubstituted amino group, a sulfonic acid group, a phosphoric acid group, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_2$-$C_{20}$ heteroalkenyl group, a substituted or unsubstituted $C_6$-$C_{30}$ aryl group, and a substituted or unsubstituted $C_6$-$C_{30}$ heteroaryl group, each of $X_1$ and $X_2$ is selected from the group consisting of a hydroxy group, a $C_1$-$C_4$ alkoxy group, a carboxyl group, and a substituted or unsubstituted amino group;

M is a polyvalent transition metal;

L is a neutral or anionic ligand;

T is a mono- or poly-substituted hydrophilic functional group;

n is an integer between 1 and 3; and

J is a linker.

2. A coloring composition comprising a colorant, at least one self-dispersible metal complex colorant and an aqueous liquid medium, wherein the at least one self-dispersible metal complex colorant is represented by formula 3:

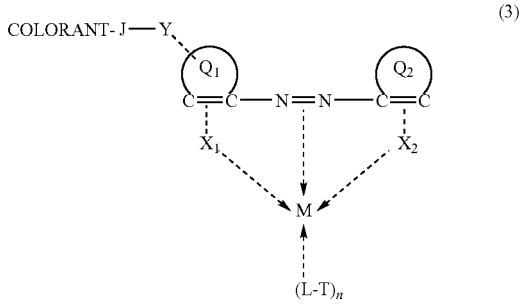

wherein:
each of $Q_1$ and $Q_2$ has at least one double bond and is independently selected from the group consisting of a substituted or unsubstituted $C_3$-$C_{20}$ cycloalkenylene group, a substituted or unsubstituted $C_6$-$C_{30}$ arylene group, a substituted or unsubstituted $C_3$-$C_{30}$ heterocycloalkenylene group, and a substituted or unsubstituted $C_4$-$C_{30}$ heteroarylene group; and
Y is selected from the group consisting of a substituted or unsubstituted $C_1$-$C_{20}$ alkylene group, a substituted or unsubstituted $C_1$-$C_{20}$ heteroalkylene group, a substituted or unsubstituted $C_2$-$C_{20}$ alkenylene group, a substituted or unsubstituted $C_2$-$C_{20}$ heteroalkenylene group, a substituted or unsubstituted $C_6$-$C_{30}$ arylene group, and a substituted or unsubstituted $C_6$-$C_{30}$ heteroarylene group,
each of $X_1$ and $X_2$ is selected from the group consisting of a hydroxy group, a $C_1$-$C_4$ alkoxy group, a carboxyl group, and a substituted or unsubstituted amino group;
M is a polyvalent transition metal;
L is a neutral or anionic ligand;
T is a mono- or poly-substituted hydrophilic functional group;
n is an integer between 1 and 3; and
J is a linker.

3. The self-dispersible metal complex colorant of claim 1, wherein the hydrophilic functional group is selected from the group consisting of —R'COOA, —COOA, —SO₃A—, —R'SO₂A, and —PO₃A, (wherein, R' is selected from the group consisting of a substituted or unsubstituted $C_1$-$C_{20}$ alkylene group, a substituted or unsubstituted $C_6$-$C_{30}$ arylene group, and a substituted or unsubstituted $C_4$-$C_{30}$ heteroarylene group, and A is selected from the group consisting of a hydrogen atom, alkali metal, ammonium, a substituted or unsubstituted $C_1$-$C_{12}$ alkyl group, and a substituted or unsubstituted $C_6$-$C_{30}$ aryl group).

4. The self-dispersible metal complex colorant of claim 1, wherein the polyvalent transition metal is selected from the group consisting of silver, gold, cerium, cobalt, chromium, copper, europium, iron, lanthanum, manganese, nickel, palladium, platinum, rhodium, ruthenium, scandium, samarium, titanium, uranium, zinc and zirconium.

5. The self-dispersible metal complex colorant of claim 1, wherein the neutral ligand is selected from the group consisting of a monodentate ligand, a bidentate ligand and a trimonodentate ligand.

6. The self-dispersible metal complex colorant of claim 1, wherein the linker is selected from the group consisting of —O—, —NR—, —N=N—, —S—, —C(=O)—NR—, —NR—C(=O)—, —S(=O)(=O)O—, —C(=O)O—, —O—C(=O)—, —P(=O)O—, —C(=O)—O—C(=O)—, —C(=O)—S—C(=O)—, —C(=O)—NR—C(=O)—, —C(=S)—O—C(=S)—, —C(=S)—NR—C(=S)—, or —C(=S)—S—C(=S)—, and a chemical bond (wherein R is a hydrogen atom, or a substituted or unsubstituted $C_1$-$C_{10}$ alkyl group).

7. A coloring composition comprising the self-dispersible metal complex colorant of claim 1 and an aqueous liquid medium.

8. The coloring composition of claim 7, wherein the concentration of the self-dispersible metal complex colorant is in a range of 1 to 20 parts by weight based on 100 parts by weight of the coloring composition.

9. The coloring composition of claim 7, wherein the aqueous liquid medium is water or a mixture of water and at least one organic solvent.

10. The coloring composition of claim 9, wherein the concentration of the organic solvent in the aqueous liquid medium is in a range of 5 to 50 parts by weight based on 100 parts by weight of the aqueous liquid medium.

11. The coloring composition of claim 7, further comprising at least one additive selected from the group consisting of a viscosity control agent, a surfactant, a storage stabilizer, a wetting agent, a pH adjusting agent and a penetrant with a concentration of 0.5 to 40 parts by weight based on 100 parts by weight of the coloring composition.

12. A coloring composition comprising a colorant, at least one self-dispersible metal complex colorant of claim 1 and an aqueous liquid medium.

13. The coloring composition of claim 12, wherein the concentration of the colorant is in a range of 1 to 15 parts by weight and the concentration of the self-dispersible metal complex colorant is in a range of 1 to 15 parts by weight based on 100 parts by weight of the coloring composition, and the total concentration of the colorant and the self-dispersible metal complex colorant is in a range of 2 to 20 based on 100 parts by weight of the coloring composition.

14. The coloring composition of claim 13, wherein the aqueous liquid medium is water or a mixture of water and at least one organic solvent.

15. The coloring composition of claim 14, wherein the concentration of the organic solvent in the aqueous liquid medium is in a range of 5 to 50 parts by weight based on 100 parts by weight of the aqueous liquid medium.

16. The coloring composition of claim 13, further comprising at least one additive selected from the group consisting of a viscosity control agent, a surfactant, a storage stabilizer, a wetting agent, a pH adjusting agent and a penetrant.

17. The coloring composition of claim 2, wherein the hydrophilic functional group is selected from the group consisting of —R'COOA, —COOA, —SO₃A—, —R'SO₂A, and —PO₃A, (wherein, R' is selected from the group consisting of a substituted or unsubstituted $C_1$-$C_{20}$ alkylene group, a substituted or unsubstituted $C_6$-$C_{30}$ arylene group and a substituted or unsubstituted $C_4$-$C_{30}$ heteroarylene group, and A is selected from the group consisting of a hydrogen atom, alkali metal, ammonium, a substituted or unsubstituted $C_1$-$C_{12}$ alkyl group, and a substituted or unsubstituted $C_6$-$C_{30}$ aryl group).

18. The coloring composition of claim 2, wherein the linker is selected from the group consisting of —O—, —NR—, —N=N—, —S—, —C(=O)—NR—, —NR—C(=O)—, —S(=O)(=O)O—, —C(=O)O—, —O—C(=O)—, —P(=O)O—, —C(=O)—O—C(=O)—, —C(=O)—S—C(=O)—, —C(=O)—NR—C(=O)—, —C(=S)—O—C (═S)—, —C(═S)—NR—C(═S)—, or —C(═S)—S—C(═S)—, and a chemical bond (wherein R is a hydrogen atom, or a substituted or unsubstituted $C_1$-$C_{10}$ alkyl group).

19. The coloring composition of claim 2, wherein the concentration of the colorant is in a range of 1 to 15 parts by weight and the concentration of the self-dispersible metal complex colorant is in a range of 1 to 15 parts by weight based on 100 parts by weight of the coloring composition, and the total concentration of the colorant and the self-dispersible metal complex colorant is in a range of 2 to 20 based on 100 parts by weight of the coloring composition.

20. The coloring composition of claim 2, wherein the aqueous liquid medium is water or a mixture of water and at least one organic solvent.

21. The coloring composition of claim 20, wherein the concentration of the organic solvent in the aqueous liquid medium is in a range of 5 to 50 parts by weight based on 100 parts by weight of the aqueous liquid medium.

22. The coloring composition of claim 2, further comprising at least one additive selected from the group consisting of a viscosity control agent, a surfactant, a storage stabilizer, a wetting agent, a pH adjusting agent and a penetrant.

23. The coloring composition of claim 2, wherein the polyvalent transition metal is selected from the group consisting of silver, gold, cerium, cobalt, chromium, copper, europium, iron, lanthanum, manganese, nickel, palladium, platinum, rhodium, ruthenium, scandium, samarium, titanium, uranium, zinc and zirconium.

24. The self-dispersible metal complex colorant of claim 1, wherein the L—T is selected from the group consisting of 4-aminobenzoic acid, 6-aminohexanoic acid and 3-hydroxybutyric acid.

25. The coloring composition of claim 2, wherein the L—T is selected from the group consisting of 4-aminobenzoic acid, 6-aminohexanoic acid and 3-hydroxybutyric acid.

26. The coloring composition of claim 7, wherein the L—T is selected from the group consisting of 4-aminobenzoic acid, 6-aminohexanoic acid and 3-hydroxybutyric acid.

* * * * *

UNITED STATES PATENT AND TRADEMARK OFFICE
CERTIFICATE OF CORRECTION

PATENT NO. : 7,638,610 B2  Page 1 of 1
APPLICATION NO. : 10/912562
DATED : December 29, 2009
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 724 days.

Signed and Sealed this

Twenty-first Day of December, 2010

David J. Kappos
*Director of the United States Patent and Trademark Office*